United States Patent
Jeunhomme et al.

[11] 4,253,727
[45] Mar. 3, 1981

[54] OPTICAL COUPLER FOR OPTICAL FIBRES

[75] Inventors: Luc Jeunhomme, Arcueil; Jean-Paul Pocholle, Ste Genevieve des Bois, both of France

[73] Assignee: Compagnie Generale d'Electricite S.A., Paris, France

[21] Appl. No.: 925,712

[22] Filed: Jul. 18, 1978

[30] Foreign Application Priority Data

Jul. 25, 1977 [FR] France .................. 77 22716

[51] Int. Cl.³ .................................. G02B 5/14
[52] U.S. Cl. ........................ 350/96.15; 350/96.18; 350/96.29
[58] Field of Search ............... 350/96.15, 96.18, 96.19, 350/96.29

[56] References Cited

U.S. PATENT DOCUMENTS

| | | | |
|---|---|---|---|
| 3,809,455 | 5/1974 | Pekau et al. | 350/96.19 |
| 4,021,099 | 5/1977 | Kawasaki et al. | 350/96.15 |
| 4,102,579 | 7/1978 | Stewart | 350/96.15 |
| 4,135,780 | 1/1979 | Dyott | 350/96.15 |
| 4,146,298 | 3/1979 | Szczepanek | 350/96.19 |

FOREIGN PATENT DOCUMENTS

| | | | |
|---|---|---|---|
| 2334125 | 7/1977 | France | 350/96.15 |
| 1460211 | 12/1976 | United Kingdom | 350/96.19 |

*Primary Examiner*—Stewart J. Levy
*Attorney, Agent, or Firm*—Sughrue, Rothwell, Mion, Zinn and Macpeak

[57] ABSTRACT

Mode coupling using grating of ridges and furrows to curve the fibre along a zig-zag path are associated with an index matcher which surrounds the fibre. The average axis of the zig-zag fibre coincides that of the matcher. Light travels along lines all at the same angle to the axis of the matcher and pass through via a conical optical end surface thereof. The optical surface converts the said rays into a parallel beam for coupling with large aperture optical means such as a photo-cell or a LED.

12 Claims, 7 Drawing Figures

OPTICAL COUPLER FOR OPTICAL FIBRES

FIELD OF THE INVENTION

The invention relates to an optical coupler for optical fibres.

BACKGROUND OF THE INVENTION

It is known that an optical fibre is constituted by a core with a refractive index N surrounded by a cladding with an index n lower than N and that it guides, in the core, light which can, for example, be modulated for telecommunications purposes. It would then be advantageous to have a coupler by which, without cutting the optical fibre, light could be inserted into the fibre or a fraction of the light which the fibre is guiding could be extracted, so that the data which the fibre is transporting would be available near the coupling point. Despite this evident need, no really effective device of this type has been proposed. Such a device must apply in particular to multimode fibres. These fibres are those in whose core light propagates in several distinct modes. They are the only fibres which are envisaged for practical industrial use (because of their relatively large diameter 0.15 mm for example with the cladding). The diameter d of the core satisfies the equation: $d.f. \sqrt{(N^2-n^2)} > 0.7656c$ where f is the frequency of the light used and c is the speed of light in a vacuum.

A known coupler is described in U.S. Pat. No. 3,931,518 (Miller). In accordance with this patent, with a view to extracting light, the high propagation constant modes which propagate in the core are initially coupled with the low propagation constant modes which propagate only in the cladding.

The propagation constant is changed by forming alternate bends in the fibre by clamping against a grating of parallel grooves cut in a transparent block. Indeed, it is known (D. Marcuse: Coupled Mode Theory for Round Optical fibres, Bell. Syst. Tech. J. 52, p 817-1973) that, when the position of the axis of the fibre, its curvature, its refractive index, or the diameter of the core fluctuate along the propagation axis there is an exchange of energy between the different modes of different values of propagation constant K.

More precisely, if the defect thus produced is sinusoidal with a space frequency P, in radians per unit length, energy is exchanged between two modes of propagation of constants K1 and K2 so such that $K1 - K2 = P$; energy can be exchanged in both directions (W. J. Stewart: Mode conversion due to periodic distortions of the fibre axis", Optical Fibre Communications Conference, Sept. 16-18, 1975).

The upper limit KM and the lower limit Km of the propagation constant K of the modes which are liable to subsist in the core are given by the equations:

$$cKM = 6.283 fN$$

and $$cKm = 6.283 fn$$

where c is the speed of light in a vacuum and f is the frequency of the light used. The coupling of a significant fraction of the transported energy results firstly from a sufficient amplitude of fibre deformation and secondly from the fact that a succession of alterante bends induces a sufficient number of mode transpositions in light which propagates in the core to obtain a final propagation constant in the core below the lower propagation limit. The light whose propagation constant has thus been reduced propagates thereafter in the cladding. It can easily be extrated by an "index adapter" constituted by a transparent medium which has a refractive index which is at least substantially equal to that of the cladding and which is in optical contact with the outer surface of the cladding. The index of the adapter must not be lower than 0.8 times that of the cladding. This adapter is constituted in the Miller patent cited above by the coupling disk 18. Light enters the adapter and is transmitted to an output device such as a photosensitive diode.

Another device for extracting light from a fibre is described in a paper entitled "Directional coupler for single multimode optical fibre" given by C. and W. J. Stewart, at the second European conference on optical fibre transmission held in Paris from 27th to 30th September, 1976 and published by the "Comité du colloque international sur les transmissions par fibres optiques", 11, rue Hamelin, 75783 PARIS Cedex 16 (Cables and connections, Part 2, p 267-268).

In this device, the index adapter is constituted by a thin plate made of a transparent material one of whose edges has an undulation which constitutes a grating and is applied against the fibre so as to deform the fibre periodically. The optical contact between this edge and the cladding of the fibre allows light to pass into this thin plate in which it flows towards a curved edge which reflects it and focusses it onto a detector placed in contact with another edge.

The disadvantage of these various light extraction devices is that they divert only a small fraction of the light which flows in the fibre to the output unit (detector). This fraction is that which leaves in a half-plane which starts from the axis of the fibre, or more exactly in the small dihedral angle formed by two half-planes which start at the axis of the fibre and are very close to each other. In the case of the device described in the Miller patent, the light exit plane is a plane which passes through the axis of the fibre and is perpendicular to the surface of the coupling disk 18. In the case of the device described in the article by Stewart, the light exit plane is that of the thin plate. It is also an advantage to produce a coupling device which inserts light in the fibre with high efficiency. This problem arises in particular when it is required to insert into the fibre as great a fraction as possible of the light produced by a light emitting diode. It is known, for this purpose, to cut the fibre and to concentrate the light which comes from the diode by means of a lens on the cut end of the fibre. The efficiency of such a light insertion device is very poor since the diode emits light from an emitting surface which is not small and over a solid angle which is large. If a lens is used which receives all the light emitted by the diode and which concentrates it entirely on the surface of the cut fibre core, the greater part of this light is at too great an angle with the axis of the fibre for this light to be able to propagate in the fibre. This disadvantage cannot be overcome by any conventional optical system because of a law which is well-known in optics, sometimes referred to as the "theorem of conservation of the geometrical dimensions of a beam". This law states that no optical system can reduce the product of the solid angle of divergence of a beam and the cross-sectional area of the beam without loss of light. This law is expressed in particular in equation 54 on P. 120 in the book "Principle of Optics" by M. Born and E. Wolf (3rd edition, published by Pergamen Press). Taking into account the characteristics of known light emitting diodes, it is observed that the insertion of their light into a fibre is always poor. The efficiency of insertion of light into the fibre can be increased considereably if light of a laser is used which has very little divergence. But other disadvantages, such as the price of the laser, its bulk, etc., then become apparent.

These known light injection devices also have the disadvantage of having to cut the fibre.

The present invention aims to produce an optical coupler for an optical fibre by which high coupling efficiency can be obtained, in particular for coupling with a light emitting diode which emits light over a large solid angle without any necessity for cutting the optical fibre.

SUMMARY OF THE INVENTION

The present invention provides an optical coupler for an optical fibre, comprising:

means for coupling the interior of the fibre to the exterior to provide coupling between light which propagates in the fibre and a set of light rays which propagate outside the fibre, surrounding the latter, the rays of this set passing in the vicinity of the axis of the fibre along the whole length of a segment of this axis and all forming the same predetermined angle with this axis; and an optical surface which is outside the fibre and which ends in a tip of revolution about this axis to provide coupling between this set of rays and a light beam which is parallel to this axis or converges at a point aligned on this axis.

Reference is made to the accompanying schematic figures to show by way of a non-limiting example how the invention may be used. Corresponding parts in a plurality of these figures are referenced therein by the same reference symbols. The paths of the light rays are shown in these figures by broken lines, with arrows showing the direction of light propagation.

DETAILED DESCRIPTION OF THE PREFERRED EMBODIMENTS

In these various figures, the coupler has an axis 2 shown by a chain-dotted line, this axis being also that of a portion of rectilinear optical fibre and/or the average axis of a portion of undulated fibre.

It has been stated hereinabove that the invention uses means for coupling between the interior and the exterior of the fibre. In the case where the invention applies to an optical fibre constituted by a core surrounded by a cladding with a lower refractive index, these coupling means can advantageously include mode coupling means which are suitable for generating alternate curves in a portion of the fibre and thus impart to this portion an undulating shape about an average axis. This couples high propagation constant modes which propagate in the core with low propagation constant modes which propagate in the cladding. These means for mode coupling are associated with an index adaptor 3 (FIGS. 1 and 2) constituted by a transparent medium whose index is not substantially lower than that of the cladding. This adaptor couples the modes which propagate in the cladding with light which propagates in this transparent medium and which constitutes said set of rays.

Figure 1:
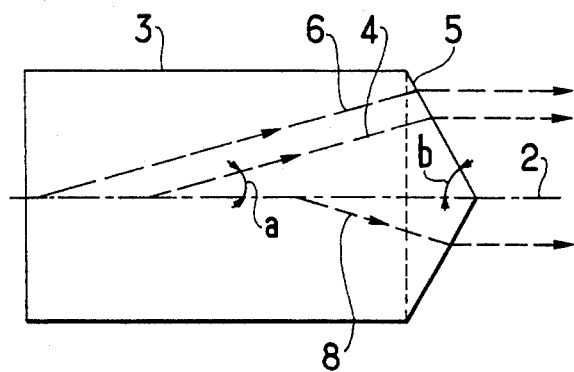
FIG. 1 shows a coupler in accordance with the invention in a cross-section in schematic form through a plane which passes through its axis, the coupling means between the interior and the exterior of the figure not being shown.
Figure 2:
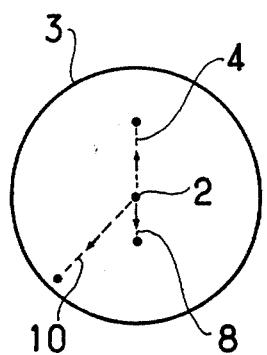
FIG. 2 is a view of the coupler of FIG. 1 in cross-section through a plane perpendicular to its axis.

Said optical surface is then constituted by a surface 5 of this index adapter. In FIGS. 1 and 2, the optical fibre is shown by a simple line along the axis 2. The index adaptor is in the shape of a full cylinder of revolution about the axis 2 and hence surrounds the fibre. This full cylinder ends at one end in a cone of revolution about the same axis and forming a point which is outwardly directed. The surface of the cone constitutes said optical surface.

The mode coupling means which have just been described are not shown in FIGS. 1 and 2. They are analogous to the dispositions described in the above-mentioned Miller patent. However, in accordance with the present invention, it been found that there exists an unexpected and useful property of light propagating in the index adaptor, either for leaving the cladding or, conversely, for being capable of entering it to form the previously mentioned modes therein. This useful property is that these light rays all form the same angle with the axis of the fibre. Therefore, they constitute a set of rays of one particular type, including, for example, the rays 4, 6, 8 and 10 in FIGS. 1 and 2. This set is different from a parallel beam at an angle to the axis because the rays are situated in various planes which pass through the axis. This set is also different from a beam which converges on the axis because it comprises rays which pass through various points of the axis.

Actually, the rays of this set do not pass exactly through the axis, but only near it. There is therefore a difference between the real rays and those of a set of rays which pass exactly through the axis. This difference is less than the radius of the fibre and is not important for using the light when considering effects at a distance from the fibre greater than its diameter. This is why the above-mentioned optical surface extends preferably to a distance from the fibre greater than ten times its diamter, so that the rays which arrive from this surface will, at least for the most part, be deflected by this surface practically in the same way as if their extensions met the axis 2 exactly.

Further, it should be observed that the above-mentioned useful property exists even when the fibre has an undulated shape which oscillates about a rectilinear average axis. In this case, this average axis constitutes the axis 2.

Lastly, it should be observed that the angle (a) (FIG. 1) which the rays of this set form with the axis 2 is not exactly predetermined. It can, for example, undergo a variation of ±1.5°. This variation is somewhat of a hindrance to the application of the invention. But the higher the refractive index of the material which constitutes the adapter, the smaller the variation. This is why its index is preferably chosen not only to be equal to that of the cladding of the fibre, (which is substantially necessaryy to couple light which propagates in the adapter with the mode which propagates in the cladding), but also to be at least equal to the index of the core of the fibre, which index is always higher than that of the cladding. The choice of a high index for the adaptor also has the advantage of increasing the angle (a) thus not requiring an excessive length of the adaptor. The value of this angle in radians is approximately given by the formula $$a^2 = n^2/n_1^2 - 1$$

where (n) is the index of the adaptor 3 and ($n_1$) is the index of the core of the fibre.

The surface shown in FIG. 1 is a diopter, i.e. it separates two media of different indeces—that of the adapter (n) and that of air (1)—and light passes through it. To couple the set of rays which propagate in the adapter, forming the angle (a) with the axis 2, to an outside beam parallel to the axis 2, this surface must then be cone-shaped with a half-angle at the apex (b) such that $$\tan b = (\cos a - 1/n)/\sin a$$

Figure 3:
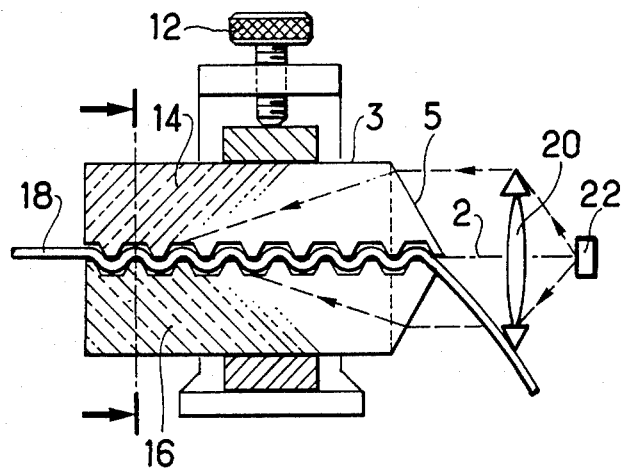
FIG. 3 is a cross-section view of a coupler for injecting light into an optical fibre, the cross-section plane passing through the coupler.

The above-mentioned mode coupling means are shown in FIG. 3 and in the following figures, in which the optical fibre is shown with a greatly enlarged diameter and with exaggerated deformations, so as to facilitate the comprehension of the drawing. These means were discussed particularly in a conference by L. Jeunhomme and J. P. Pocholle "T Coupler for multimode optical fiber", (North Atlantic Treaty Organization, Advisory Group for Aerospace Research and Development, AGARD, 7, rue Ancelle, 92200 NEUILLY SUR SEINE, France). The report of this conference can be obtained from ONERA, 29 avenue de la Division Leclerc, 92 CHATILLON SOUS BAGNEUX, France and from the National Technical Information Service (NTIS) 5285 Port Royal Road, Spring Field, Va. 22151, USA.

The optical action of these means can be defined by two magnitudes: the pitch P of the regular succession of alternate curves and the amplitude of the deformation. This amplitude lies typically between 10 and 100 microns. The pitch of the succession of alternate curves must be defined accurately. Calling the radius of the core of the fibre (r), the index of this core $n_1$ and the index of the cladding $n_2$, it can be written that the optimum value of P varies with r/2D for a fibre with a step index profile and with r/1.41D for a fibre with a parabolic index profile, where $$D^2 = (n_1 - n_2)/n_1.$$

For example, in a typical fibre in which $D^2 = 6 \times 10^{-3}$ and $r = 0.0425$ mm, P must be approximately 2 mm. Actually, it appears that P can lie between 1.4 mm and 4 mm.

When an arrangement for extracting light from the fibre is to be produced, the length of the undulating portion of this fibre lies between about 10 and 50 mm and must be followed by a portion which is at least 10 mm long in optical contact with the adaptor. When light is to be injected in the fibre, this undulating portion must be in optical contact with the index adapter and its length must in principle be sufficient for all rays coming from said optical surface to reach this undulating portion and this undulating portion must extend downstream beyond the illuminated portion.

Although the mode coupling means described hereinabove seem to be the most advantageous, other means could be used such as, for example, a regular succession of thin portions and of thick portions of the fibre core.

The embodiments which will now be described use an index adapter with a shape which is generally that of a solid cylinder of revolution which is made of a glass whose index is n=1.4859 for a light wavelength of 6.328 angstroms. This adapter could, however, just as well be made of a moldable hard transparent plastics material of high index. The optical fibre has a core diameter of 85 microns, a core index $n_1 = 1.4645$ and a cladding index $n_2 = 1.4565$. The angle (a) is a=12.6°. In cases where the optical surface is a dioptre, the half-angle at the apex of the cone is b=54°29'. The index adapter 3 is constituted by two parts 14 and 16 each having a semi-circular shape so as to form a complete circle by bringing these two parts together by a pressing means such as a screw 12 (FIG. 3). Each of the plane surfaces which face these two parts comprises a regular succession of ridges and furrows at a pitch of P=2 mm, disposed so that the furrows of one succession will face the ridges of the other. Thus, an undulating form is imparted to the portion of fibre 18 which is clamped between these two parts. The two successions of ridges and furrows form an assembly which is often referred to as a "grating". The optical contact between the fibre and the adapter is improved by the use of a suitable transparent oil whose index is between that of the cladding and that of the adapter. This oil is retained by capillarity. It can be silicon grease sold under the trade name of Polyectrene 128 by PRODELEC. The light injection device shown in FIGS. 3 and 4 includes an adapter with a diameter of 26 mm and a length on the axis of 75 mm, including the conical part. This length is occupied entirely by the grating. A converging step lens 20 (Fresnel lens) is disposed coaxially with the adapter on the same side as the cone. It has a diameter of 25.4 mm and a focal length of 10 mm. The emitting surface of a light-emitting diode 22 of the usual type, with a radiation pattern closly resembling a cosine law is disposed at the focus of and beyond this lens. The greater part of the light emitted by this diode is received by the lens 20, transformed into a beam parallel to the axis 2 and transformed by the conical optical surface of the adapter into a set of rays forming a suitable angle with the axis and propagating towards the axis inside the adapter. It therefore meets the fibre cladding which it enters and in which it propagates, forming therein the above-mentioned modes, which are rapidly transformed into modes which propagate in the core by the mode coupling caused by the grating. The length of the grating is sufficient for this latter transformation to be nearly complete. High injection efficiency is thus obtained. It is not necessary to cut the fibre 18 but only to bend it on the outside of the adapter to leave room for the lens 20 which must be as close as possible to the adapter.

Figure 5:
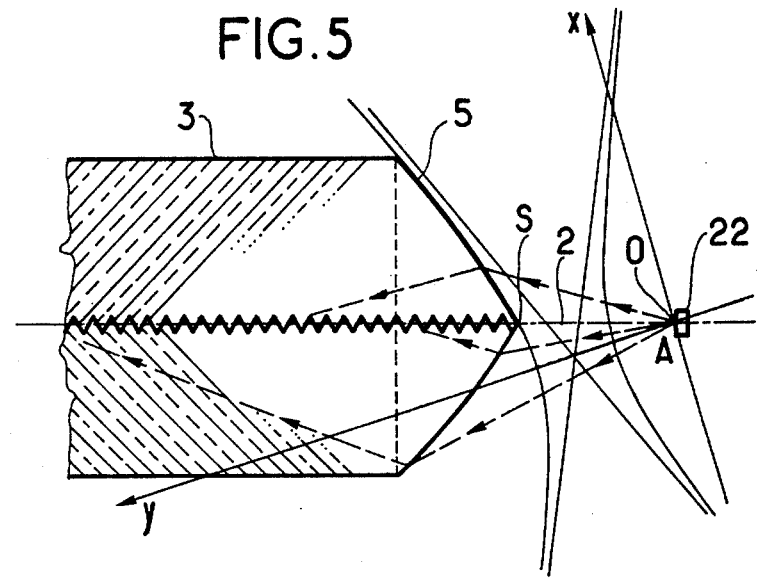
FIG. 5 shows in thick lines a view of a coupler in accordance with the invention in a cross-section through a plane which passes through its axis. In this figure, thin lines show various straight lines and a hyperbola which can be drawn in the cross-section plane to make it easier to understand the shape of the optical surface of the coupler.

Use of the lens 20 can be avoided by imparting to the optical surface 5 the shape of a rounded tip while keeping the value of the half-angle at the apex. Such a disposition is shown in FIG. 5, which shows in thick lines parts which actually exist. The shape of the pointed optical surface is then no longer conical and can be defined as follows:

1—It is a body of revolution about the axis 2.
2—It keeps the same apex S as previously which constitutes the end of the tip.
3—It keeps the same value of the half-angle at the apex, i.e. at the apex, it is tangential to the previously described cone.
4—It is generated by the rotation of an arc of a hyperbola which passes through the apex S and rotates about the axis 2.
5—To give a clearer definition:
  denote the distance between this apex S and the emitting surface of the diode 22 by (e) and the refractive index of the adapter 3 by (n);
  cut the optical surface through a plane which passes through the axis 2, for example the plane in FIG. 5;
  draw an axis passing through the centre O of the emitting surface in the plane, with the axis Oy being parallel to a ray of said set of rays in the adapter, i.e. at the previously defined angle (a) to the axis 2, and draw an axis perpendicular to Oy;
  consider on its own one half of the segment of the optical surface through the plane, e.g. the half which is situated below the axis 2 in FIG. 5, and then this half-section of the optical surface through the plane is an arc of a hyperbola defined by the equation:

$$x^2 + y^2 = (ny + e - ne \cos a)^2.$$

This hyperbola and its axes $Ox$ $Oy$ and its asymptotes have been drawn in thin lines in FIG. 5. It must however be well understood that these elements drawn in thin lines cannot be seen on the injection arrangement itself. They only help to understand how the optical surface can be defined.

Figure 6:
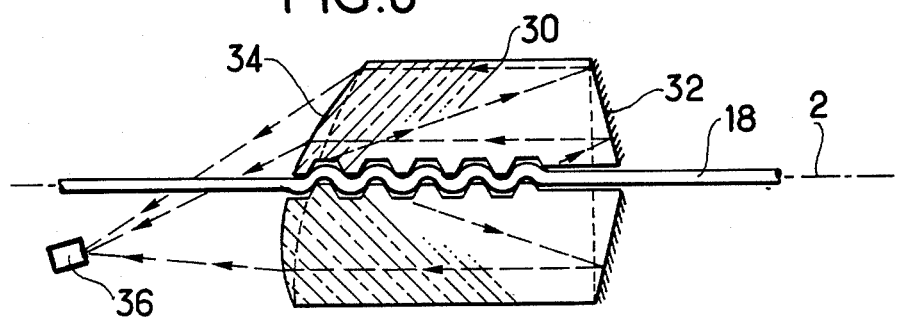
FIG. 6 is a longitudinal sectional view which shows a coupler for extracting light in accordance with the invention, using a reflecting optical surface, this coupler being cut through a plane which passes through its axis.

The light extraction device shown in FIG. 6 includes an index adapter 30 analogous to the previous device. Its diametre is 30 mm. It includes a grating which extends from its rear surface along a length of 44 mm and is prolonged forwards by a zone 16 mm long in which the fibre 18 does not undergo any deformation, optical contact being maintained. This adapter ends near the front in a conical convex optical surface 32 which has at its apex a half-angle equal to $$90° - 12.6°/2 = 83.7°.$$

This optical surface is covered with metal so that the light which reaches it from the fibre is reflected in the adapter, forming a beam parallel to the axis 2, reaching the front surface 34. This front surface constitutes a converging diopter which is well known to opticans and which converges the outgoing beam of the adapter towards a receiving diode 36. This converging diopter is excentric in relation to the axis 2, so that the diode 36 can be placed off the axis 2. Thus, the fibre 18 need not be cut or bent outside the adapter.

Figure 4:
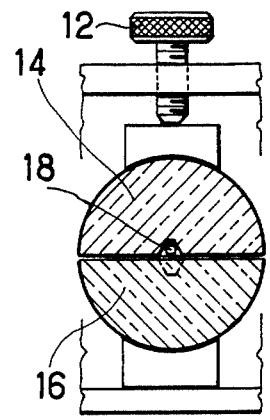
FIG. 4 is a view of the coupler of FIG. 3 in cross-section through a plane perpendicular to its axis.

There has just been described, with reference to FIGS. 3 and 4, a light injection device which uses a refractive optical surface and, with reference to FIG. 6, a light extraction device which uses a reflecting optical surface. It is, however, quite obvious that a refractive optical surface could be used in a light extraction device and that a reflective optical surface could be used in a light injection device.

Figure 7:
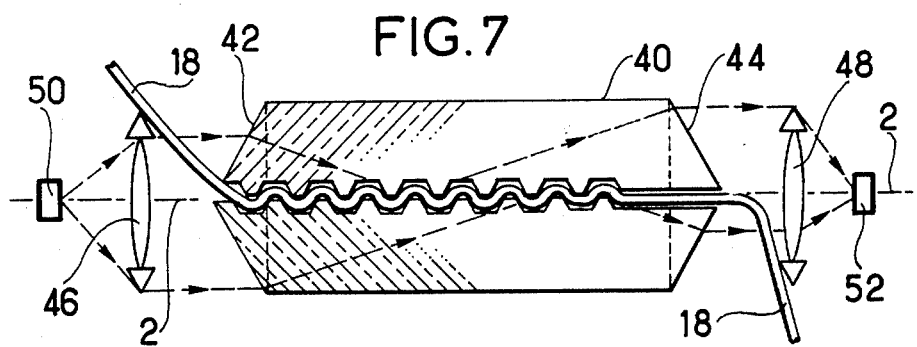
FIG. 7 is a view of a coupler for injecting and extracting light in accordance with the invention, in cross-section through a plane which passes through its axis.

Further, as shown in FIG. 7, light can be injected or extracted with a single index adapter which has a single grating and has at its front and rear ends a refractive optical surface, an input optical surface 42 and an output optical surface 44. These optical surfaces can be conical. They must then each be associated with respective converging lenses 46 and 48 if small components—a light-emitting diode 50 and a receiving diode 52 respectively are to be coupled thereto.

We claim:

1. A releasable optical coupler for coupling light into or from an intermediate part of an optical fibre without damaging the fibre, said fibre being constituted by a core surrounded by a cladding with a lower refractory index, said coupler comprising:
   first and second transparent coupler parts and forming first and second gratings facing each other, respectively, said gratings being constituted by two regular successions of ridges and furrows formed respectively on oppositely facing surfaces of said two transparent parts, the ridges of one grating facing the furrows of the other;
   pressure means for pressing the ridges against two opposite sides of the optical fibre in order to form alternate bends in a portion of the fibre and thus to impart to this portion of the fibre an undulating form about an average axis, so as to couple modes with high propagation constants which propagate in the core to modes with low propagation constants which propagate in the cladding, said first and second coupling parts together forming an index adapter constituted by a transparent medium whose index is not substantially lower than that of the cladding so as to couple said modes which propagate in the cladding to light which propagates in said transparent medium and which constitutes an inner set of rays, the rays of this set passing in the vicinity of the axis of the fibre along the whole length of a segment of this axis and all forming a same predetermined angle with this axis; and
   said index adapter having an optical surface in the form of a tip of revolution about said axis to provide coupling between this set of rays and a light beam which is parallel to this axis or converges at a point aligned on this axis.

2. A coupler according to claim 1, wherein said optical surface extends up to a distance from the fibre greater than ten times the diameter of said fibre and said index adapter has an optical index at least equal to that of the fibre core.

3. A coupler according to claim 2, wherein said diopter is in the form of a surface of revolution defined by an arc of a hyperbola rotated about said axis of the fibre, this hyperbola being in a plane which passes through this axis and having an axis of symmetry which, with said axis of the fibre, forms the same angle as the rays of said set of rays, so as to transform mutually said set of rays and a light beam which converges at a point aligned on this axis of the fibre and on said axis of symmetry of the hyperbola.

4. A coupler according to claim 2, for injecting light into the optical fibre wherein said grating extends along the whole length of the zone which receives light from said optical surface and extends downstream beyond this zone.

5. A coupler according to claim 2, for extracting light from the optical fibre wherein said index adapter comprises an extra output zone about one centimetre long which provides optical contact with a rectilinear portion of the fibre consecutive to said undulating portion which bears against said grating, the axis of this rectilinear portion forming the extension of the average axis of this undulating portion, said optical surface of revolution about this common axis being disposed so as to receive durectly light leaving this rectilinear portion and from at least a part of this undulating portion close to this rectilinear portion.

6. A coupler according to claim 5, wherein said index adapter comprises an input optical surface and an output optical surface on opposite sides of said grating so that the mode coupling means constituted by this grating can be used both for injection of light into the fibre through the input optical surface and for extraction of light from the output optical surface.

7. A coupler according to claim 2, wherein said optical surface is a diopter which refracts light.

8. A coupler according to claim 7, wherein said diopter is in the form of a cone of revolution about said axis so as to transform mutually said set of rays and a light beam which is parallel to this axis.

9. A coupler according to claim 8, further comprising a converging system outside said index adapter for focussing this parallel beam at a point outside this adapter.

10. A coupler according to claim 8, wherein said optical surface is a reflecting surface for reflecting light towards the interior of the index adapter and is in the form of a cone of revolution about said axis so as to transform mutually said set of rays and a light beam parallel to this axis and inside this adapter.

11. A coupler according to claim 10, wherein the adapter also has a converging diopter which transforms mutually this interior parallel beam and an exterior converging beam at a point aligned on this axis.

12. A coupler according to claim 11 wherein said convergent diopter transforms between the internal parallel beam and external beam converging at a point at a distance from the axis of the fibre.

* * * * *